UNITED STATES PATENT OFFICE.

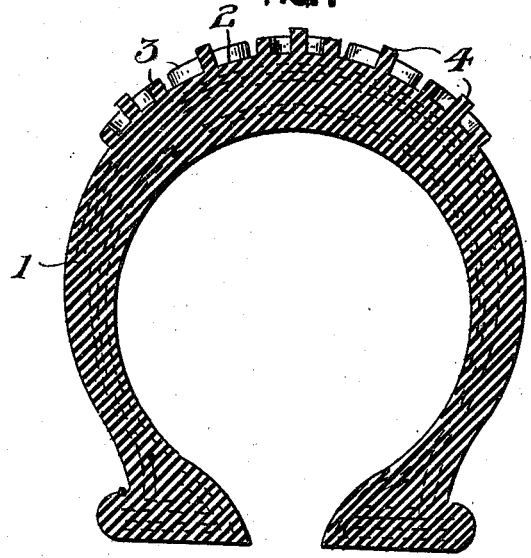
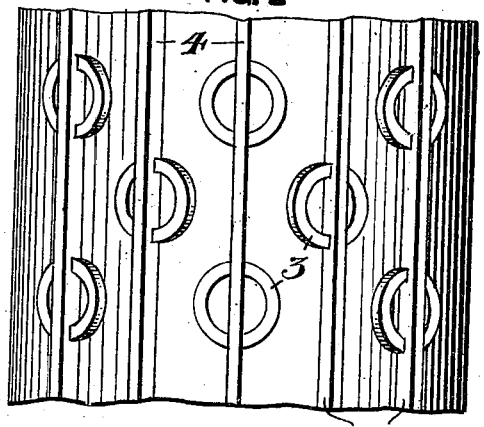
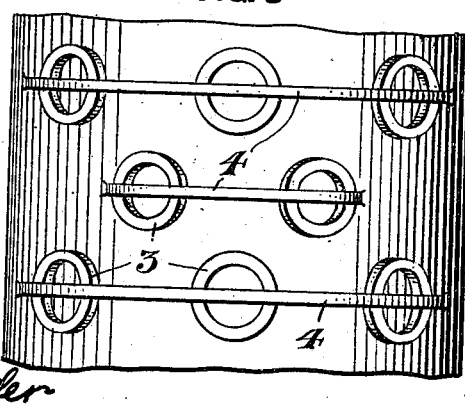

WILMER DUNBAR, OF GREENSBURG, PENNSYLVANIA.

VACUUM-TREAD FOR TIRES.

1,147,149.   Specification of Letters Patent.   Patented July 20, 1915.

Application filed November 16, 1912. Serial No. 731,827.

*To all whom it may concern:*

Be it known that I, WILMER DUNBAR, a citizen of the United States of America, residing at Greensburg, in the county of Westmoreland and State of Pennsylvania, have invented certain new and useful Improvements in Vacuum-Treads for Tires, of which the following is a specification, reference being had therein to the accompanying drawing.

This invention relates to vacuum treads for tires, and my invention aims to provide:—First, a tire having positive and reliable means upon the surface thereof, as hereinafter set forth, for producing a vacuum tread. Second, a tire, outer tube or shoe having vacuum cups that are arranged in a manner as to be successively brought into action for producing a suction between the tire and the surface of a road or street for preventing the tire from slipping thereon. Third, a tire, outer tube or shoe having vacuum cups that are reinforced by ribs that prevent the edges of the cups from being unduly worn or injured and insuring a positive action of the same in producing a vacuum tread. Fourth, a tire, outer tube or shoe having vacuum cups reinforced by circumferentially arranged ribs that serve as an anti-skidding means for preventing the tire from skidding laterally upon a wet or smooth surface. Fifth, a vacuum tread for tires that has cups braced in a manner as to maintain their shape while the tire is in action and produce a vacuum between the tire and a surface by reason of the sealing edges of the cups being maintained in shape for the purposes for which they are intended. Sixth, a vacuum tread for tires that is inexpensive to manufacture, durable and highly efficient as an anti-skidding means for the periphery of a wheel.

My invention further aims to accomplish the above results by a mechanical construction that will be hereinafter specifically described and then claimed.

Reference will now be had to the drawing, wherein:—

Figure 1 is a cross sectional view of the tire, Fig. 2 is a plan of a portion of the same, and Fig. 3 is a similar view illustrating a slight modification of the invention.

Further describing my invention in detail with reference to the accompanying drawing, wherein like numerals denote corresponding parts throughout; 1 denotes a tire, outer tube or shoe made of rubber, yieldable composition or a suitable material and formed integral with the tread 2 of the tire are cups or rings 3 arranged in transverse rows circumferentially of the tread of the tire, with the cups or rings of one transverse row staggered with relation to the cups or rings of an adjoining row, the cups or rings being equally spaced whereby the tread of the tire will present a cupped surface.

As illustrated in Figs. 1 and 2, the cups or rings are intersected by circumferentially arranged equally spaced ribs 4 that are formed integral with the tire and the cups. The ribs 4 are of a greater depth than the cups and brace diametrically opposed sides of the cups, as best shown in Fig. 2.

A slight modification of the arrangement shown in Fig. 2 is illustrated in Fig. 3, wherein the ribs 4 are arranged transversely of the tread 2 instead of circumferentially thereof. In action, the ribs 4 depending below the cups 3 are compressed to such an extent as to permit the peripheral or sealing edges of the cups 3 evenly engaging the surface of a road or street and producing a vacuum or suction that tends to prevent the tire from slipping. As the ribs 4 are subjected to compression before the edges of the cups 3, the cups 3 can easily adjust or shape themselves to firmly engage a surface and correctly perform the function for which they are used. The sealing edges of the cups are prevented from being unduly injured or worn by reason of the ribs bracing said cups and being subjected to compression prior to said cups. Besides maintaining the cups in shape the ribs serve as an anti-skidding means and the formation of said ribs is as easily accomplished in manufacture as the cups 3 of the tire.

I attach considerable importance to the fact of the ribs being of a greater depth than the cups and the arrangement of the ribs by which the cups are braced.

While in the drawings there is illustrated the preferred embodiments of my invention, it is to be understood that the structural elements are susceptible to such variations and modifications as fall within the scope of the appended claims.

What I claim is:—

1. A new article of manufacture comprising an outer shoe having its tread provided with cups, and means integral with the shoe tread connecting the walls of each cup together to brace said walls and capable of compression prior to the compression of the walls of said cups whereby the sealing edges of said cups are maintained in shape.

2. As a new article of manufacture, an outer shoe for a tire having its tread provided with integral cups, and bracing means integral with the tread of said shoe and connecting the inner and outer walls of the cups together thereby bracing said walls, said means of greater height than said walls whereby the means will be compressed in advance of the bracing of the walls of the cups.

3. A tire body having its tread composed of a plurality of lug units each having suction cups and also having a bearing projection on its outer face between the said cups.

4. A tire tread provided with suction cups and also having a rib higher than the cups, connecting and traversing the said cups.

In testimony whereof I affix my signature in the presence of two witnesses.

WILMER DUNBAR.

Witnesses:
W. F. WEGLEY,
J. M. TRUXAL.

Copies of this patent may be obtained for five cents each, by addressing the "Commissioner of Patents, Washington, D. C."